(12) United States Patent
Perez Barrera

(10) Patent No.: US 10,633,094 B2
(45) Date of Patent: Apr. 28, 2020

(54) UNMANNED AERIAL VEHICLE FOR CLEANING

(71) Applicant: Ford Global Technologies, LLC, Dearborn, MI (US)

(72) Inventor: Oswaldo Perez Barrera, Texcoco (MX)

(73) Assignee: Ford Global Technologies, Dearborn, MI (US)

( * ) Notice: Subject to any disclaimer, the term of this patent is extended or adjusted under 35 U.S.C. 154(b) by 285 days.

(21) Appl. No.: 15/641,404

(22) Filed: Jul. 5, 2017

(65) Prior Publication Data

US 2019/0009908 A1  Jan. 10, 2019

(51) Int. Cl.
*B64C 39/02* (2006.01)
*B64D 1/18* (2006.01)
*B60S 3/04* (2006.01)
*B05B 13/00* (2006.01)
*B60S 3/00* (2006.01)

(52) U.S. Cl.
CPC .............. *B64D 1/18* (2013.01); *B05B 13/005* (2013.01); *B60S 3/04* (2013.01); *B64C 39/024* (2013.01); *B60S 3/002* (2013.01); *B64C 2201/027* (2013.01); *B64C 2201/108* (2013.01); *B64C 2201/12* (2013.01)

(58) Field of Classification Search
CPC .. A47L 1/02; B64D 1/18; B64D 47/00; B60S 3/002; B60S 3/04; B64C 39/02; B64C 39/024; B64C 2201/00; B64C 2201/027; B64C 2201/12; B64C 2201/108
See application file for complete search history.

(56) References Cited

U.S. PATENT DOCUMENTS

| 2016/0052027 A1* | 2/2016 | Chin | B08B 1/00 |
| | | | 134/6 |
| 2017/0200530 A1* | 7/2017 | Davis | H01B 7/28 |
| 2017/0210470 A1* | 7/2017 | Pardell | B08B 1/006 |

FOREIGN PATENT DOCUMENTS

| CN | 104210659 B | 1/2016 |
| CN | 104787342 B | 6/2016 |
| CN | 106419772 A | 2/2017 |
| JP | 2017003541 A | 1/2017 |
| KR | 20160126358 A | 11/2016 |
| WO | WO 2016165793 A1 | 10/2016 |

\* cited by examiner

*Primary Examiner* — Randall E Chin
(74) *Attorney, Agent, or Firm* — Frank A. MacKenzie; Bejin Bieneman PLC

(57) ABSTRACT

A system includes an unmanned aerial vehicle including a chassis, a tank attached to the chassis, a sprayer fluidly connected to the tank, a heating element attached to the chassis, a fan drawing air over the heating element, and a clamp attached to the chassis; and a computer in communication with the unmanned aerial vehicle and programmed to instruct the clamp to attach to an external sensor of a vehicle, instruct the sprayer to spray water and detergent onto the external sensor, and instruct the fan to blow heated air at the external sensor.

12 Claims, 10 Drawing Sheets

UNMANNED AERIAL VEHICLE FOR CLEANING

BACKGROUND

Vehicles, such as autonomous vehicles, typically include a variety of sensors. Some sensors detect internal states of the vehicle, for example, wheel speed, wheel orientation, and engine and transmission variables. Some sensors detect the location and/or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
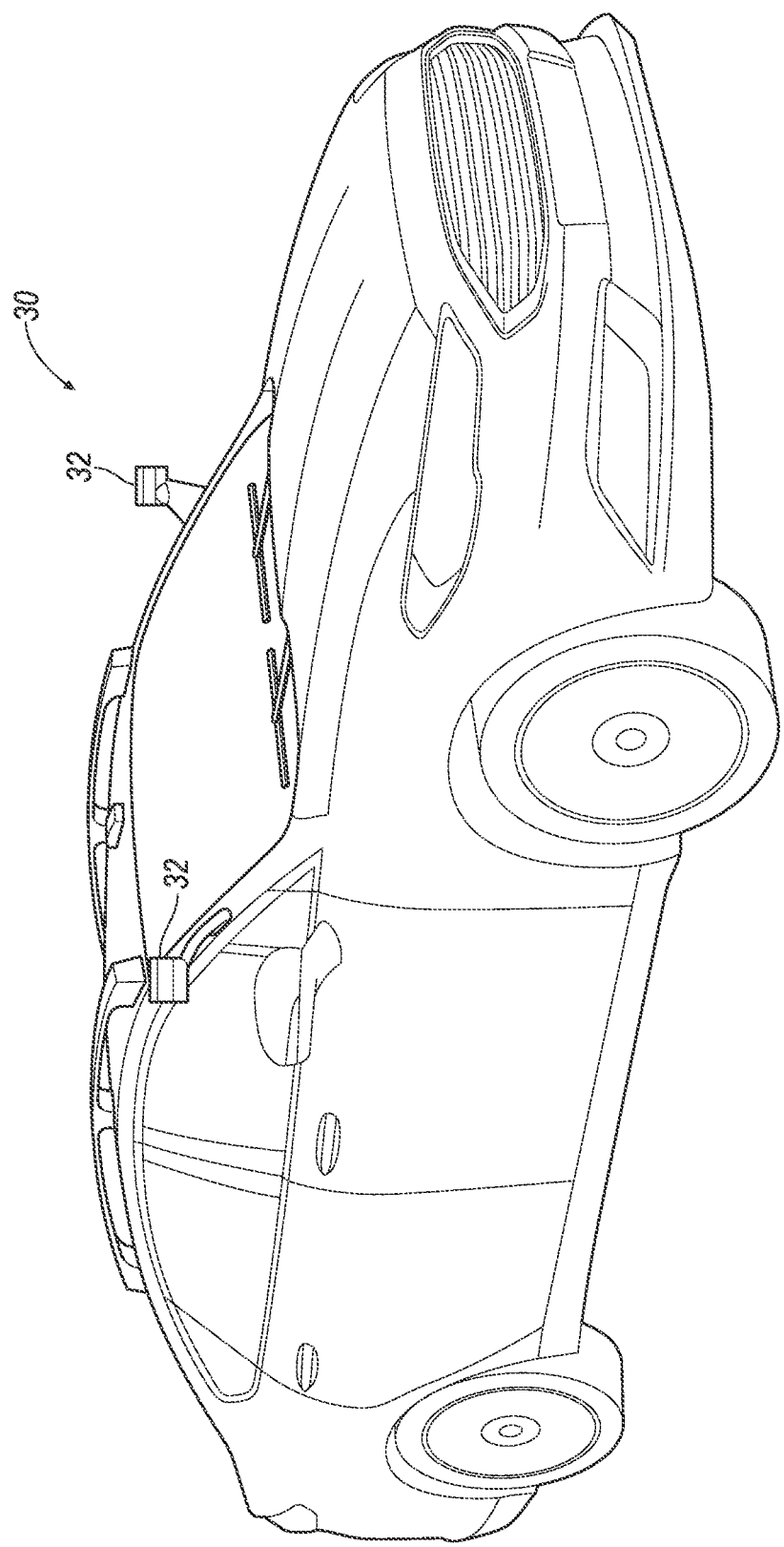
FIG. 1 is a perspective view of an example vehicle having external sensors.

An unmanned aerial vehicle includes a chassis, a tank attached to the chassis, a sprayer fluidly connected to the tank, a heating element attached to the chassis, a fan drawing air over the heating element, and a clamp attached to the chassis.

The unmanned aerial vehicle may include a brush movably connected to the clamp. The clamp may be a first clamp, and the unmanned aerial vehicle may further include a second clamp attached to the chassis. The sprayer may be movably connected to the second clamp. The tank may be a first tank and the sprayer may be a first sprayer, and the unmanned aerial vehicle may further include a second tank attached to the chassis and a second sprayer fluidly connected to the second tank, and the second sprayer may be movably connected to the first clamp. The unmanned aerial vehicle may include a third clamp attached to the chassis, and the heating element may be movably connected to the third clamp.

The clamp may include two clamp halves movable relative to each other. The clamp halves may be semicircular.

A computer is programmed to instruct an unmanned aerial vehicle to attach to an external sensor of a vehicle, spray water and detergent onto the external sensor, rinse the external sensor, and blow heated air at the external sensor.

The computer may be programmed to instruct the unmanned aerial vehicle to attach to the external sensor before spraying water and detergent. The computer may be programmed to instruct the unmanned aerial vehicle to, after spraying water and detergent and before rinsing, detach from and attach to the external sensor. The computer may be programmed to instruct the unmanned aerial vehicle to attach with a first clamp before spraying water and detergent, and to attach with a second clamp between spraying water and detergent and rinsing. The computer may be programmed to instruct the unmanned aerial vehicle to, after rinsing and before blowing heated air, detach from and attach to the external sensor. The computer may be programmed to instruct the unmanned aerial vehicle to attach with a first clamp before spraying water and detergent, to attach with a second clamp between spraying water and detergent and rinsing, and to attach with a third clamp between rinsing and blowing heated air.

A system includes an unmanned aerial vehicle including a chassis, a tank attached to the chassis, a sprayer fluidly connected to the tank, a heating element attached to the chassis, a fan drawing air over the heating element, and a clamp attached to the chassis; and a computer in communication with the unmanned aerial vehicle and programmed to instruct the clamp to attach to an external sensor of a vehicle, instruct the sprayer to spray water and detergent onto the external sensor, and instruct the fan to blow heated air at the external sensor.

The computer may be programmed to instruct the clamp to attach to the external sensor before instructing the sprayer to spray water and detergent. The clamp may be a first clamp, and the unmanned aerial vehicle may further include a second clamp attached to the chassis. The computer may be further programmed to instruct the first clamp to detach from the external sensor, and then instruct the second clamp to attach before instructing the fan to blow heated air.

The unmanned aerial vehicle may further include a brush movably connected to the clamp.

The tank may be a first tank, the sprayer may be a first sprayer, the unmanned aerial vehicle may further include a second tank attached to the chassis and a second sprayer fluidly connected to the second tank, and the computer may be further programmed to instruct the second sprayer to rinse the external sensor.

The unmanned aerial vehicle (UAV) described herein cleans a sensor and may thus allow the sensor, after being completely or partly soiled or covered with dirt, water, ice, condensation, bird droppings, dead insects, and/or other debris or obstructions, to provide useful data and/or to more accurately detect an external environment through which a vehicle moves. Because the UAV is separate from the vehicle, the vehicle does not need to carry cleaning equipment, or needs to carry less cleaning equipment, saving expense and space for the vehicle. A single UAV can service several vehicles, providing additional efficiency.

Figure 11:
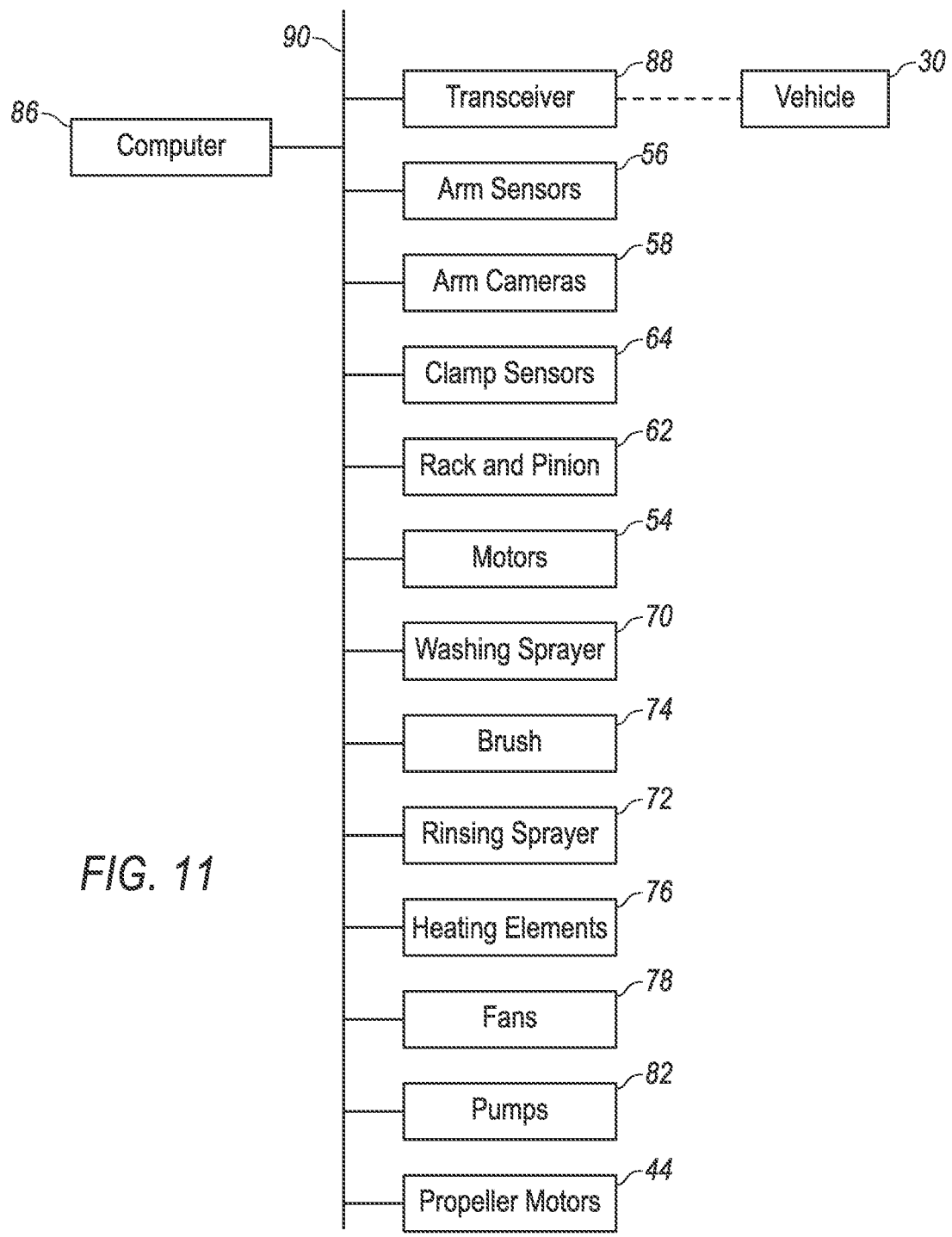
FIG. 11 is a block diagram of a control system of the unmanned aerial vehicle.

With reference to FIGS. 1 and 11, a vehicle 30 may be an autonomous, semi-autonomous, or nonautonomous vehicle. A vehicle computer (not shown) can be configured to operate the vehicle 30 independently of the intervention of a human driver, completely or to a lesser degree. The vehicle computer may be programmed to operate the propulsion, brake system, steering, and/or other vehicle systems (not shown). For the purposes of this disclosure, autonomous operation means the vehicle computer controls the propulsion, brake system, and steering; semi-autonomous operation means the vehicle computer controls one or two of the propulsion, brake system, and steering and a human driver controls the remainder; and nonautonomous operation means the human driver controls the propulsion, brake system, and steering. The vehicle 30 may include a vehicle transceiver (not shown) to communicate with a remote server, i.e., a server distinct and spaced from the vehicle 30, e.g., another vehicle (V2V), an infrastructure component (V2I), an unmanned aerial vehicle 34, etc.

Figure 9:
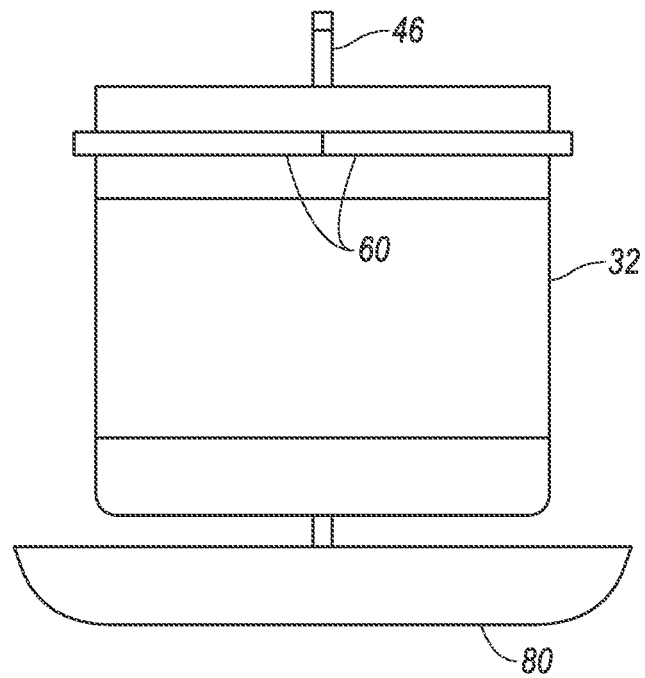
FIG. 9 is a side view of one of the clamps attached to the external sensor.

With reference to FIGS. 1 and 9, the vehicle 30 includes an external sensor 32. The external sensor 32 may detect the external world, i.e., the environment outside of the body of the vehicle 30. For example, the external sensor 32 may be a radar sensor, scanning laser range finder, light detection and ranging (LIDAR) device, or image processing sensor such as a camera. In particular, the external sensor 32 may be a LIDAR device. A LIDAR device detects distances to objects by emitting laser pulses and measuring the time of flight for the pulse to travel to the object and back. The external sensor 32 is in communication with the vehicle computer.

Figure 2:
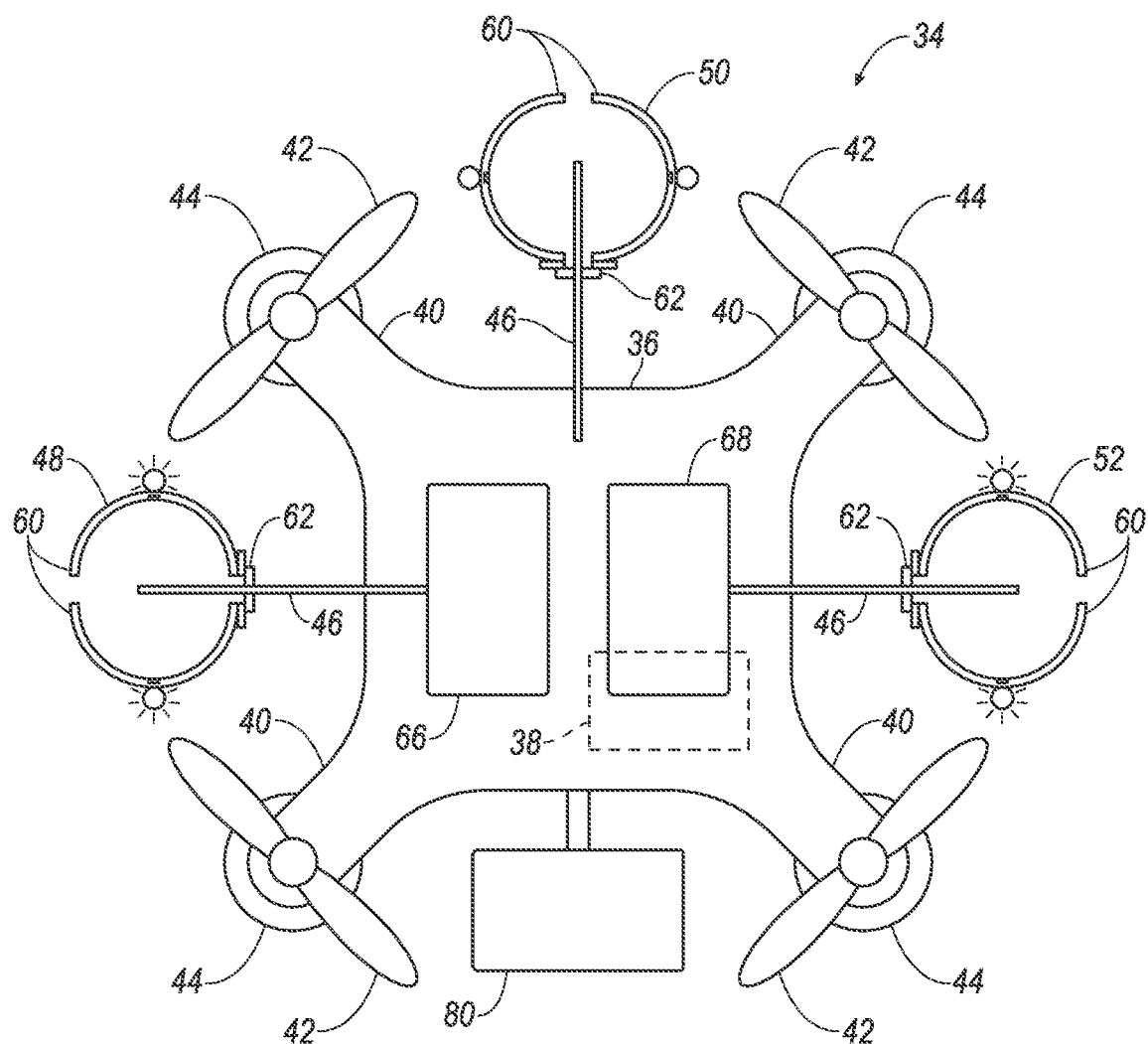
FIG. 2 is a top view of an example unmanned aerial vehicle.

With reference to FIG. 2, the unmanned aerial vehicle (UAV) 34 is capable of flying. The UAV 34 may be able to, e.g., hover in place, translate itself in three dimensions, rotate about a vertical axis, and perform actions combining those movements.

Components of the UAV 34 may be mounted on, or within, a chassis 36 of the UAV 34. The chassis 36 may include an internal or external support frame, a housing, etc. The chassis 36 may house a battery 38 for powering the UAV 34. The battery 38 may be of any suitable type for vehicular electrification, for example, lithium-ion batteries, nickel-metal hydride batteries, lead-acid batteries, ultracapacitors, etc.

Booms 40 extend from the chassis 36. The booms 40 may be fixed or movable relative to the chassis 36. The booms 40 may be cantilevered from the chassis 36, i.e., may be fixed at one end to the chassis 36, extend from the chassis 36, and be supported only by the chassis 36. The booms 40 support propellers 42 and propeller motors 44.

With reference to FIGS. 2 and 11, the propeller motors 44 may be electrically connected to the battery 38. The propellers 42 may be rotatably connected to respective propeller motors 44. The propellers 42 may be shaped to generate lift when moving through the air. The propeller motors 44 may rotate the propellers 42 to generate lift for the UAV 34 to fly. The UAV 34 may include four propellers 42, i.e., may be a quadcopter.

With reference to FIGS. 2-9, clamp arms 46 extend from the chassis 36. The clamp arms 46 may be fixed or movable relative to the chassis 36. The clamp arms 46 may be cantilevered from the chassis 36. The clamp arms 46 support clamps 48, 50, 52, motors 54, and components attached to the clamps 48, 50, 52.

With reference to FIGS. 4, 6, 8, and 11, the clamp arms 46 support arm sensors 56 and/or arm cameras 58. For example, each clamp arm 46 may support one arm sensor 56 and one arm camera 58. The arm sensors 56 and arm cameras 58 may each face downward. The arm sensors 56 and arm cameras 58 for one of the clamp arms 46 may be positioned at or near a center of the clamp 48, 50, 52 supported by that clamp arm 46. The arm sensor 56 may be, e.g., an ultrasonic sensor. An ultrasonic sensor measures a distance from the ultrasonic sensor to an object by transmitting a sound wave at a predetermined frequency and detecting a sound wave at that frequency reflected by the object.

With reference to FIGS. 2-9, the clamps 48, 50, 52 are attached to the chassis 36 via the clamp arms 46. The clamps 48, 50, 52 include a washing clamp 48, a rinsing clamp 50, and a drying clamp 52. The clamps 48, 50, 52 may be identical. The clamps 48, 50, 52 are sized to each reversibly attach to the external sensor 32. The clamps 48, 50, 52 may use any mechanism that reversibly attaches to the external sensor 32. When attached to the external sensor 32, the clamp 48, 50, 52 holds the UAV 34 in position relative to the external sensor 32.

Each clamp 48, 50, 52 may include two clamp halves 60 movable relative to each other. The clamp halves 60 may have an internal shape matching an external shape of the external sensor 32; for example, the clamp halves 60 may be semicircular. The clamp halves 60 may have a diameter substantially equal to a diameter of the external sensor 32. Each clamp 48, 50, 52 may include a rack and pinion 62 for moving the clamp halves 60 relative to the clamp arm 46. The rack and pinion 62 may linearly move the clamp halves 60 away and toward each other.

With reference to FIGS. 3-8 and 11, each clamp 48, 50, 52 includes a clamp sensor 64. The clamp sensors 64 may be positioned on one or both clamp halves 60 for each clamp 48, 50, 52. The clamp sensors 64 may face in a direction that the clamp half 60 is moved by the rack and pinion 62 toward the corresponding clamp half 60. The clamp sensor 64 may be, e.g., an ultrasonic sensor.

Figure 10:
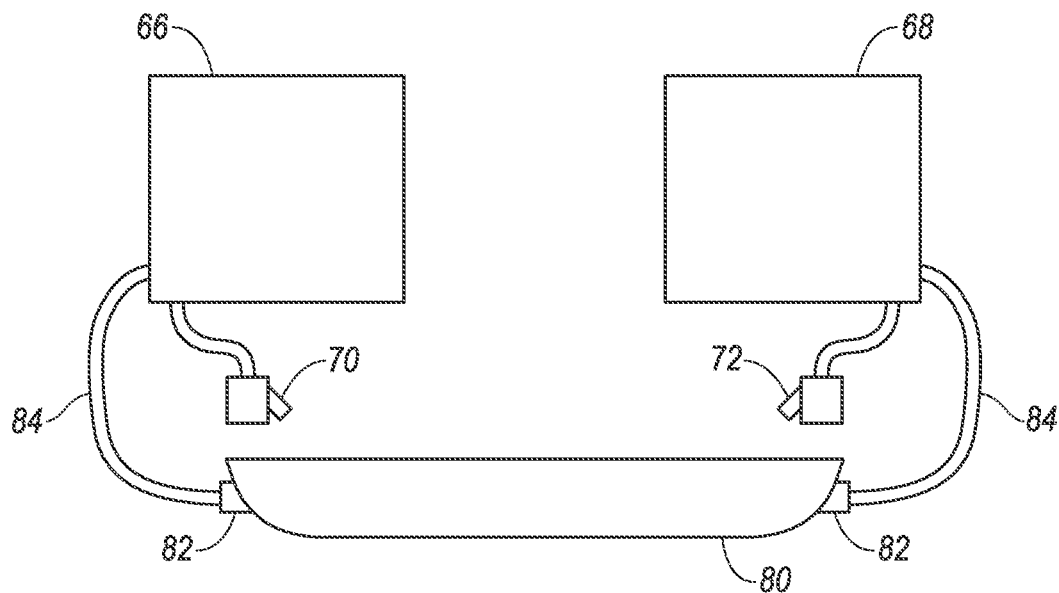
FIG. 10 is a diagram of a water-recycling system of the unmanned aerial vehicle.

With reference to FIGS. 2 and 10, two tanks 66, 68 are attached to the chassis 36. The tanks 66, 68 include a washing tank 66 and a rinsing tank 68. The tanks 66, 68 are reservoirs for holding liquids. The tanks 66, 68 may be positioned above or below the chassis 36.

Figure 4:
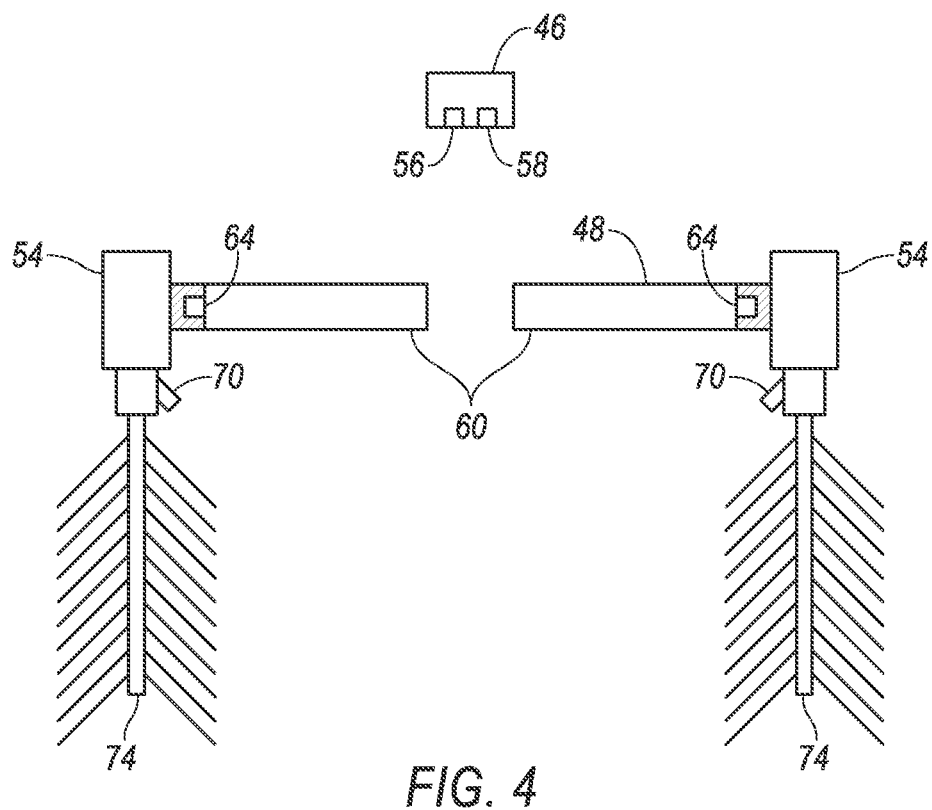
FIG. 4 is a cross-sectional view of the first clamp along line 4-4.
Figure 5:
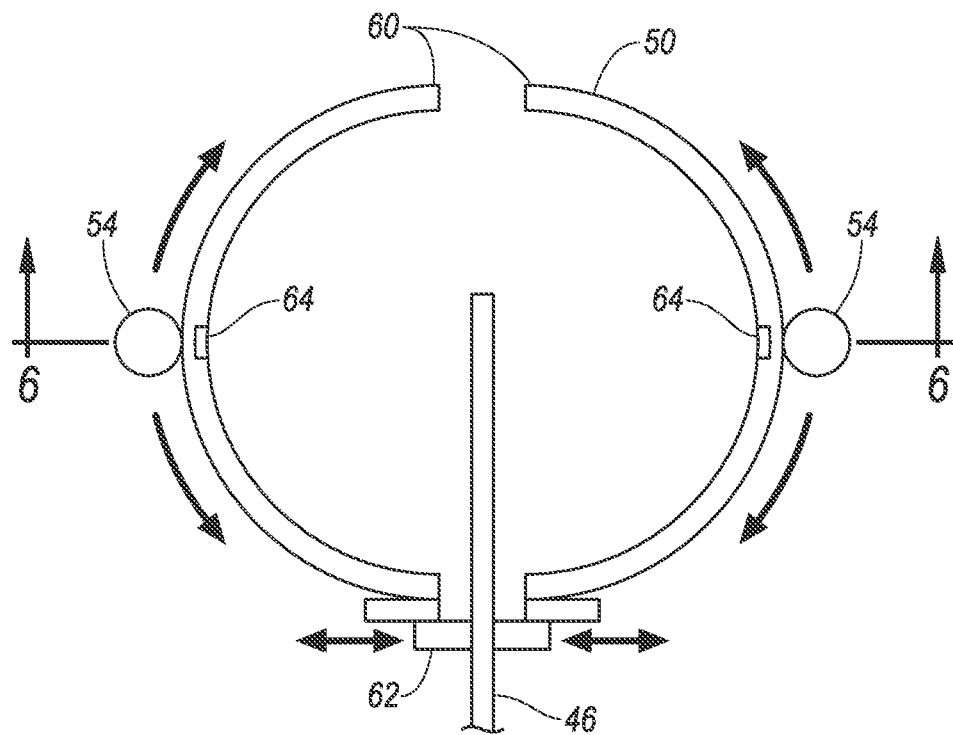
FIG. 5 is a top view of a second clamp of the unmanned aerial vehicle.
Figure 6:
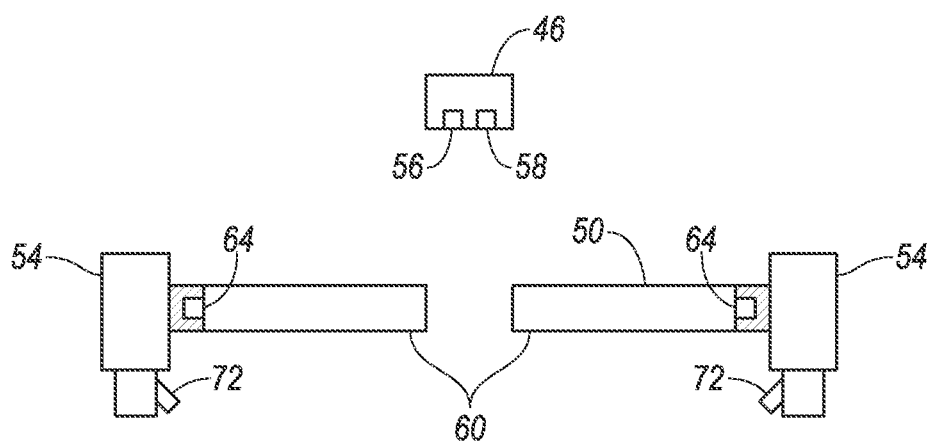
FIG. 6 is a cross-sectional view of the second clamp along line 6-6.

With reference to FIGS. 4, 6, and 10, sprayers 70, 72 are movably connected to the clamps 48, 50 and fluidly connected to the tanks 66, 68. Specifically, washing sprayers 70 are movably connected to the washing clamp 48 and fluidly connected to the washing tank 66, and rinsing sprayers 72 are movably connected to the rinsing clamp 50 and fluidly connected to the rinsing tank 68. The sprayers 70, 72 are positioned to eject liquid received from the respective tank 66, 68 onto the external sensor 32 when the respective clamp 48, 50 is attached to the external sensor 32. The sprayers 70, 72 are movable along the substantially semicircular shape of the respective clamp half 60.

With reference to FIGS. 3-8 and 11, motors 54 provide power to move the sprayers 70, 72 relative to the clamps 48, 50. The sprayers 70, 72 are movable via any suitable mechanism, such a pulley and a belt or a gear mechanism (not shown). The motors 54 may be any suitable motor, such as an electric motor.

Figure 3:
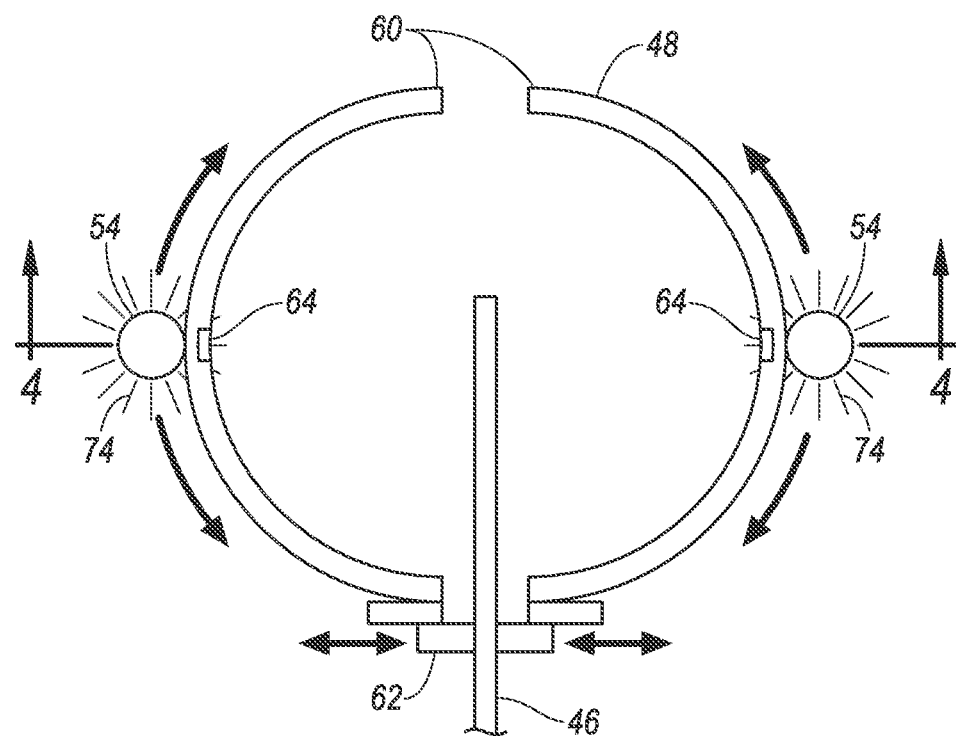
FIG. 3 is a top view of a first clamp of the unmanned aerial vehicle.

With reference to FIGS. 3-4 and 11, brushes 74 are movably connected to the washing clamp 48. Specifically, one brush 74 may be attached to each clamp half 60. The brushes 74 may include bristles extending radially from an axis. The brushes 74 may be positioned so that the bristles contact the external sensor 32 when the washing clamp 48 is attached to the external sensor 32. The brushes 74 are movable via any suitable mechanism, such as a pulley and a belt or a gear mechanism (not shown). The brushes 74 are movable along the substantially semicircular shape of the respective clamp half 60 of the washing clamp 48. For example, each brush 74 may be fixed relative to the washing sprayer 70 and move relative to the washing clamp 48 with the washing sprayer 70.

Figure 7:
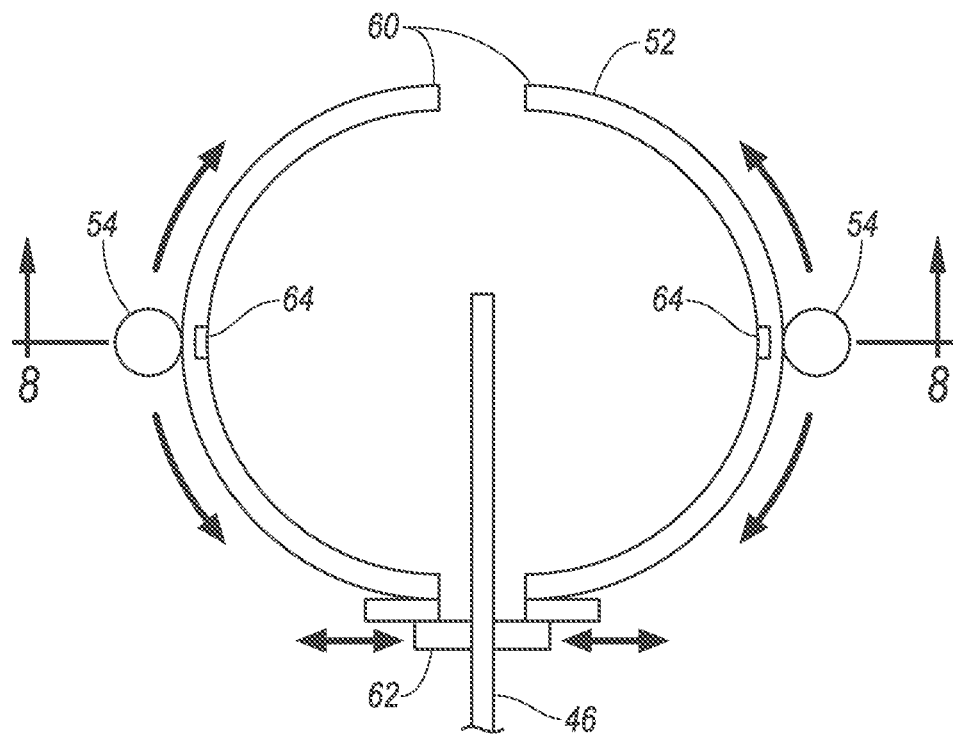
FIG. 7 is a top view of a third clamp of the unmanned aerial vehicle.
Figure 8:
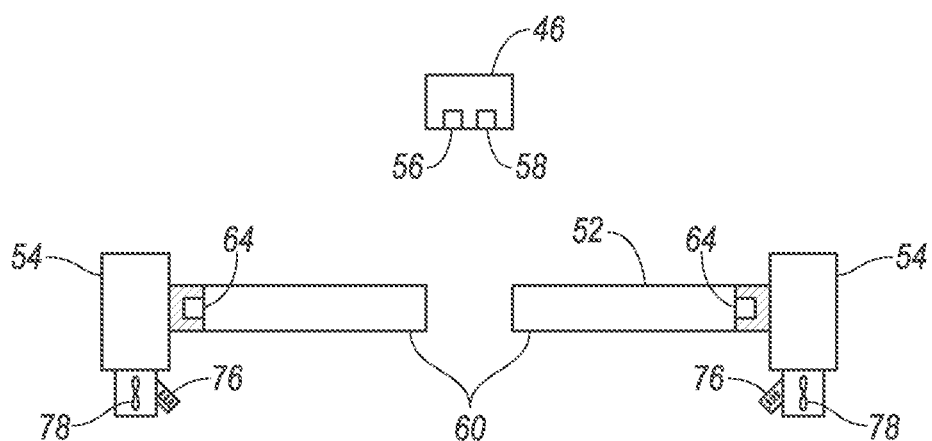
FIG. 8 is a cross-sectional view of the third clamp along line 8-8.

With reference to FIGS. 7-8 and 11, a heating element 76 is attached to the chassis 36 via the drying clamp 52 and the corresponding clamp arm 46. The heating element 76 may be movably connected to the drying clamp 52. The heating element 76 may have a high electrical resistance and produce heat in response to electric current flowing through the heating element 76, i.e., resistive or Joule heating. The heating element 76 may be formed of any material producing sufficient heat in response to electric current, e.g., Kanthal, nichrome, cupronickel, molybdenum disilicide, positive temperature coefficient (PTC) ceramic, etc., or combinations of such materials. The heating element 76 may be shaped to have a high ratio of surface area to volume, such as a coil.

A fan 78 is typically positioned to draw air over the heating element 76. The airflow passes over the heating element 76 to the external sensor 32 when the drying clamp 52 is attached to the external sensor 32. The fan 78 may be fixed relative to the heating element 76. The fan 78 may be movably connected to the drying clamp 52.

With reference to FIGS. 9 and 10, a water receiver 80 is rotatably connected to the chassis 36. The water receiver 80 may be rotatable to positions below each of the clamps 48, 50, 52, or at least below the washing clamp 48 and the rinsing clamp 50. The water receiver 80 may have a bowl-like shape for catching water running off the external sensor 32 during washing or rinsing.

With reference to FIGS. 10 and 11, pumps 82 and tubes 84 may fluidly connect the water receiver 80 with the tanks 66, 68. One pump 82 and tube 84 may lead from the water receiver 80 to the washing tank 66, and one pump 82 and tube 84 may lead from the water receiver 80 to the rinsing tank 68.

With reference to FIG. 11, the UAV 34 includes a computer 86. The computer 86 is a microprocessor-based computer. The computer 86 includes a processor, memory, etc. The memory of the computer 86 includes memory for storing instructions executable by the processor as well as for electronically storing data and/or databases.

A transceiver 88 is adapted to transmit signals wirelessly through any suitable wireless communication protocol, such as Bluetooth®, WiFi, IEEE 802.11a/b/g, other RF (radio frequency) communications, etc. The transceiver 88 may be adapted to communicate with a remote server, that is, a server distinct and spaced from the UAV 34. The remote server may be located outside the UAV 34. For example, the remote server may be associated with the vehicle 30 (as shown in FIG. 11), infrastructure components, emergency responders, mobile devices associated with the owner of the vehicle 30, etc. The transceiver 88 may be one device or may include a separate transmitter and receiver.

With continued reference to FIG. 11, the computer 86 may transmit signals through a communications network 90 such as a controller area network (CAN) bus, Ethernet, WiFi, Local Interconnect Network (LIN), onboard diagnostics connector (OBD-II), and/or by any other wired or wireless communications network. The computer 86 may be in communication with the transceiver 88, the arm sensors 56, the arm cameras 58, the clamp sensors 64, the rack and pinion 62, the motors 54, the washing sprayers 70, the brushes 74, the rinsing sprayers 72, the heating element 76, the fan 78, the pumps 82, and the propeller motors 44 via the communications network 90.

Figure 12:
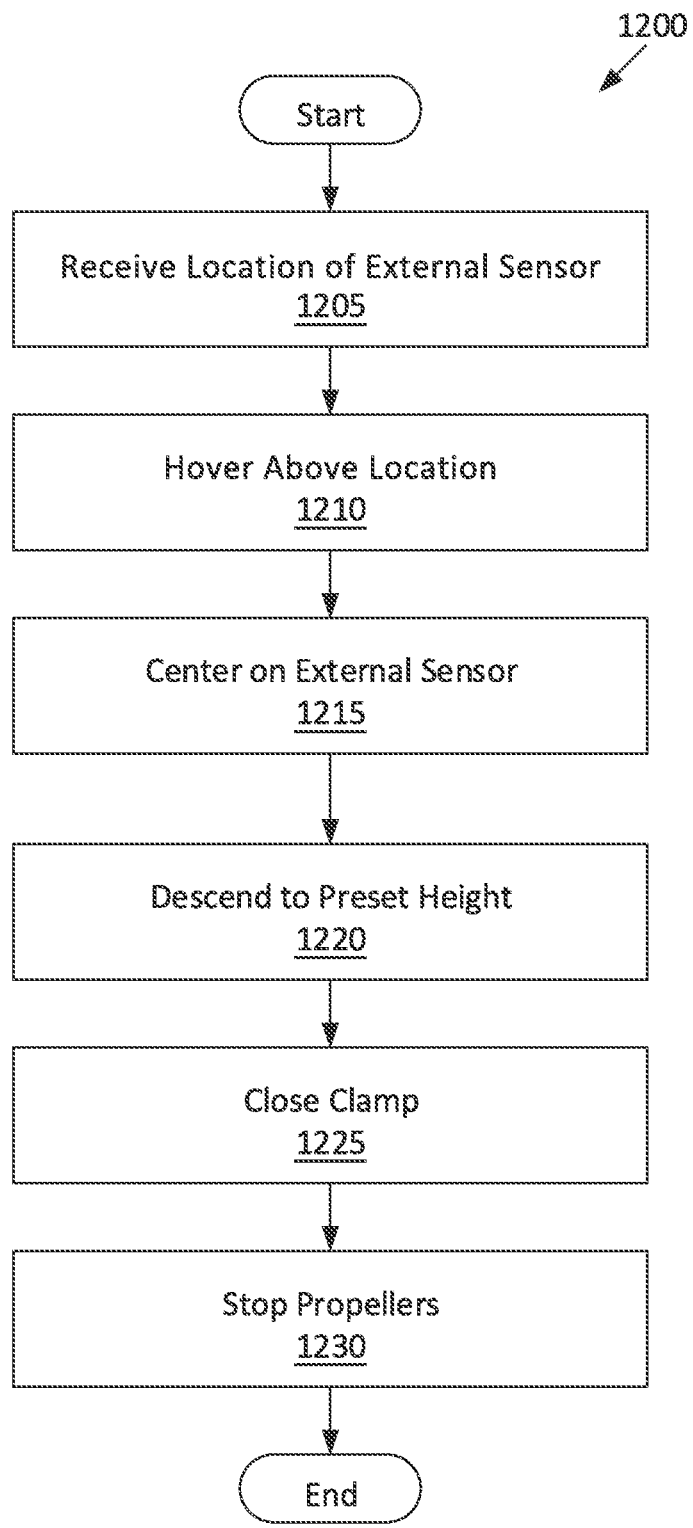
FIG. 12 is a process flow diagram of an exemplary process for the unmanned aerial vehicle to attach to one of the external sensors.

FIG. 12 is a process flow diagram illustrating an exemplary process 1200 for the UAV 34 to attach to the external sensor 32 of the vehicle 30. The computer 86 instructs the UAV 34 to perform the process 1200. The memory of the computer 86 stores programming for performing the steps of the process 1200.

The process 1200 begins in a block 1205, in which the computer 86 receives a location of the external sensor 32. The location may be transmitted by the remote server associated with the vehicle 30 to the transceiver 88, e.g., along with a request by the vehicle 30 for cleaning the external sensor 32. The location may be in the form of geocoordinates in two or three dimensions such as are known.

Next, in a block 1210, the computer 86 instructs the propeller motors 44 to make the UAV 34 hover above the external sensor 32. Specifically, the UAV 34 may hover so that the location of the external sensor 32 is below one of the clamps 48, 50, 52. The computer 86 may substantially continuously receive a location of the UAV 34, compare the location of the UAV 34 to the location of the external sensor 32, and instruct the propeller motors 44 to move the UAV 34 closer to the location of the external sensor 32, in a two-dimensional coordinate system. The UAV 34 may hover at a clearance distance above a height of the external sensor 32. The clearance distance may be a preset value chosen so that the external sensor 32 is within a field of view of the arm camera 58 given a known uncertainty in the location received from the external sensor 32. The height of the external sensor 32 may be received as part of the location of the external sensor 32, or the height of the external sensor 32 may be a preset value corresponding to a standard height for the external sensor 32 when installed on the vehicle 30.

Next, in a block 1215, the computer 86 instructs the propeller motors 44 to center the clamp 48, 50, 52 above the external sensor 32. The computer 86 may substantially continuously receive data from the arm camera 58 to center the clamp 48, 50, 52 above the external sensor 32 within a feedback loop, i.e., the computer 86 instructs the propeller motors 44 to move the UAV 34 parallel to the ground, receives data from the arm camera 58, instructs the propeller motors 44 to move the UAV 34 parallel to the ground, etc., until the clamp 48, 50, 52 of the UAV 34 is centered on the external sensor 32, i.e., is directly above the external sensor 32 such that the external sensor 32 is in a middle of the field of view of the arm camera 58. The computer 86 may use known object recognition technique(s) to locate the external sensor 32 within visual images received from the arm camera 58, and to determine location and distance of various components with respect to each other. The arm camera 58 may be positioned at a center of the clamp 48, 50, 52, and the external sensor 32 may be centered at a center of the field of view of the arm camera 58.

Next, in a block 1220, the computer 86 instructs the propeller motors 44 to descend the UAV 34 to a preset height above the external sensor 32. The preset height may be chosen so that the clamp 48, 50, 52 is able to close on and attach the UAV 34 to the external sensor 32. The computer 86 may continuously receive data from the arm sensor 56 of a distance to the external sensor 32 to position the UAV 34 within a feedback loop, i.e., the computer 86 instructs the propeller motors 44 to change the height of the UAV 34, receives data from the arm sensor 56, instructs the propeller motors 44 to change the height of the UAV 34, etc., until the UAV 34 is at the preset height.

Next, in a block 1225, the computer 86 instructs the clamp 48, 50, 52 to close, i.e., instructs the rack and pinion 62 to move the clamp halves 60 together. The clamp halves 60 move toward each other to attach the UAV 34 to the external sensor 32. The computer 86 may continuously receive data from the clamp sensors 64 of the distance of the clamp halves 60 from the external sensor 32 to close the clamp 48, 50, 52 within a feedback loop, i.e., the computer 86 instructs the clamp halves 60 to move, receives data from the clamp sensors 64, instructs the clamp halves 60 to move, etc., until the clamp halves 60 are pressing against the external sensor 32.

Next, in a block 1230, the computer 86 instructs the propeller motors 44 to stop the propellers 42. The UAV 34 is now held up by the clamp 48, 50, 52 rather than by lift generated by the propellers 42. After the block 1230, the process 1200 ends.

Figure 13:
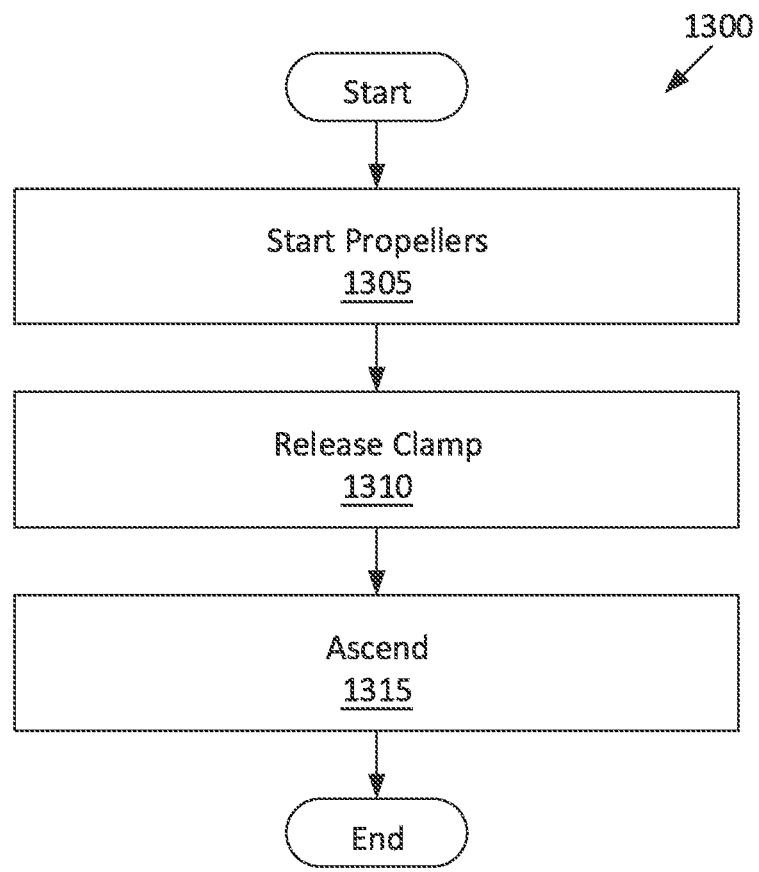
FIG. 13 is a process flow diagram of an exemplary process for the unmanned aerial vehicle to detach from one of the external sensors.

FIG. 13 is a process flow diagram illustrating an exemplary process 1300 for the UAV 34 to detach from the external sensor 32 of the vehicle 30. The computer 86 instructs the UAV 34 to perform the process 1300. The memory of the computer 86 stores programming for performing the steps of the process 1300.

The process 1300 begins in a block 1305, in which the computer 86 instructs the propeller motors 44 to start rotating the propellers 42. The propellers 42 are then generating lift.

Next, in a block 1310, the computer 86 instructs the clamp 48, 50, 52 to open, i.e., instructs the rack and pinion 62 to move the clamp halves 60 apart. The clamp halves 60 may move a preset distance apart. The preset distance may be chosen so that the UAV 34 does not accidentally impact the external sensor 32 while hovering.

Next, in a block 1315, the computer 86 instructs the propeller motors 44 to ascend the UAV 34 up from the external sensor 32. The UAV 34 may ascend to the clearance distance above the external sensor 32 described above with respect to the block 1210. The computer 86 may substantially continuously receive data from the arm sensor 56 of a distance to the external sensor 32 to position the UAV 34 within a feedback loop, i.e., the computer 86 instructs the propeller motors 44 to change the height of the UAV 34, receives data from the arm sensor 56, instructs the propeller motors 44 to change the height of the UAV 34, etc., until the UAV 34 is at the clearance distance above the external sensor 32. After the block 1315, the process 1300 ends.

Figure 14:
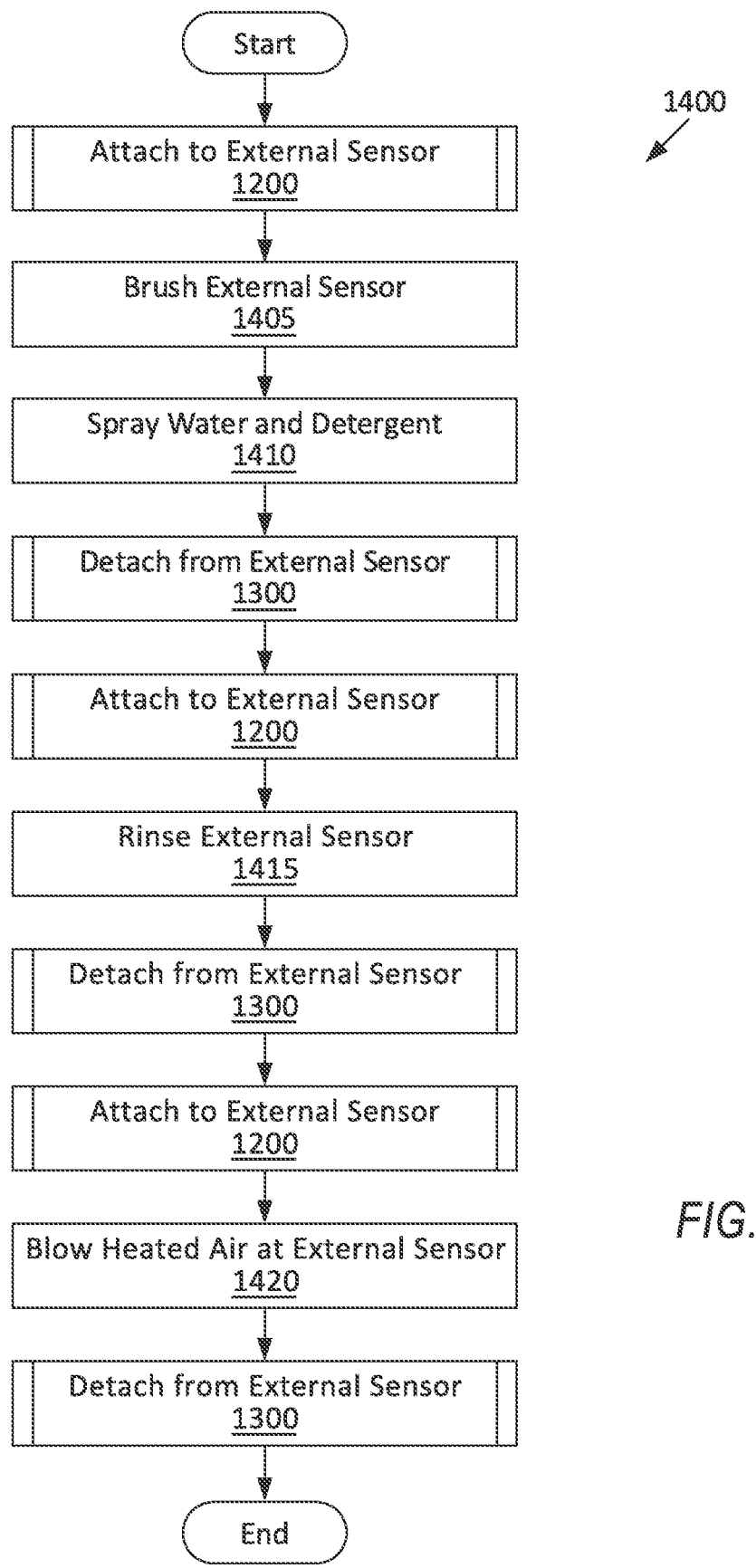
FIG. 14 is a process flow diagram of an exemplary process for the unmanned aerial vehicle to wash one of the external sensors.

FIG. 14 is a process flow diagram illustrating an exemplary process 1400 for the UAV 34 to wash the external sensor 32 of the vehicle 30. The computer 86 instructs the UAV 34 to perform the process 1400. The memory of the computer 86 stores programming for performing the steps of the process 1400.

The process 1400 begins with the computer 86 performing the process 1200 to attach to the external sensor 32 with the washing clamp 48. The process 1200 is performed using the washing clamp 48, the arm camera 58 attached to the clamp arm 46 for the washing clamp 48, and the arm sensor 56 attached to the clamp arm 46 for the washing clamp 48.

Next, in a block 1405, the computer 86 instructs the motors 54 to move the brushes 74 along the washing clamp 48 and brush the external sensor 32. The brushes 74 may brush for a preset duration or a preset number of cycles. The preset duration or preset number of cycles may be chosen by experimentation to determine how much brushing is sufficient to remove different types of debris, e.g., bird droppings, dead insects, etc., with at least, e.g., 95 percent confidence.

Next, in a block 1410, the computer 86 instructs the washing sprayers 70 to spray water and detergent onto the external sensor 32. The washing tank 66 may hold a mixture of water and detergent that feeds to the washing sprayers 70. The washing sprayers 70 may move along the washing clamp 48 while spraying, one washing sprayer 70 along each clamp half 60; i.e., the motors 54 may move the washing sprayers 70 along the washing clamp 48. The washing sprayers 70 may spray for a preset duration. The preset duration may be chosen by experimentation to determine how much spraying is sufficient to remove different types of debris, e.g., dust buildup, with at least, e.g., 95 percent confidence. The blocks 1405 and 1410 may occur simultaneously, with the motors 54 moving the brushes 74 and the washing sprayers 70 together.

Next, the computer 86 performs the process 1300 to detach from the external sensor 32 with the washing clamp 48. The process 1300 is performed using the washing clamp 48, the arm camera 58 attached to the clamp arm 46 for the washing clamp 48, and the arm sensor 56 attached to the clamp arm 46 for the washing clamp 48.

Next, the computer 86 performs the process 1200 to attach to the external sensor 32 with the rinsing clamp 50. The process 1200 is performed using the rinsing clamp 50, the arm camera 58 attached to the clamp arm 46 for the rinsing clamp 50, and the arm sensor 56 attached to the clamp arm 46 for the rinsing clamp 50.

Next, in a block 1415, the computer 86 instructs the rinsing sprayers 72 to rinse the external sensor 32, i.e., spray water onto the external sensor 32. The rinsing tank 68 may hold water that feeds to the rinsing sprayers 72. The rinsing sprayers 72 may move along the rinsing clamp 50 while spraying; i.e., the motors 54 may move the rinsing sprayers 72 along the rinsing clamp 50. The rinsing sprayers 72 may spray for a preset duration. The preset duration may be chosen by experimentation to determine how much spraying is sufficient to remove detergent left by the washing sprayers 70 with at least, e.g., 95 percent confidence.

Next, the computer 86 performs the process 1300 to detach from the external sensor 32 with the rinsing clamp 50. The process 1300 is performed using the rinsing clamp 50, the arm camera 58 attached to the clamp arm 46 for the rinsing clamp 50, and the arm sensor 56 attached to the clamp arm 46 for the rinsing clamp 50.

Next, the computer 86 performs the process 1200 to attach to the external sensor 32 with the drying clamp 52. The process 1200 is performed using the drying clamp 52, the arm camera 58 attached to the clamp arm 46 for the drying clamp 52, and the arm sensor 56 attached to the clamp arm 46 for the drying clamp 52.

Next, in a block 1420, the computer 86 instructs the fan 78 and the heating element 76 to blow heated air at the external sensor 32, i.e., instructs the fan 78 to blow and instructs the heating element 76 to heat up. The fan 78 and the heating element 76 operate for a preset duration. The preset duration may be chosen by experimentation to determine how long is sufficient to dry the water left behind by the rinsing sprayers 72 with at least, e.g., 95 percent confidence.

Next, the computer 86 performs the process 1300 to detach from the external sensor 32 with the drying clamp 52. The process 1300 is performed using the drying clamp 52, the arm camera 58 attached to the clamp arm 46 for the drying clamp 52, and the arm sensor 56 attached to the clamp arm 46 for the drying clamp 52. After performing the process 1300, the process 1400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance or order.

"Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An unmanned aerial vehicle comprising:
a chassis;
a tank attached to the chassis;
a sprayer fluidly connected to the tank;
a heating element attached to the chassis;
a fan drawing air over the heating element; and
a clamp attached to the chassis;
wherein the clamp includes two clamp halves movable relative to each other;
the clamp halves are semicircular in shape; and
the sprayer is movable along the semicircular shape of one of the clamp halves.

2. The unmanned aerial vehicle of claim 1, wherein the clamp is a first clamp, the unmanned aerial vehicle further comprising a second clamp attached to the chassis and a brush movably connected to the second clamp.

3. The unmanned aerial vehicle of claim 1, wherein the clamp is a first clamp, the unmanned aerial vehicle further comprising a second clamp attached to the chassis.

4. The unmanned aerial vehicle of claim 3, wherein the sprayer is movably connected to the second clamp.

5. The unmanned aerial vehicle of claim 4, wherein the tank is a first tank and the sprayer is a first sprayer, the unmanned aerial vehicle further comprising a second tank attached to the chassis and a second sprayer fluidly connected to the second tank, the second sprayer movably connected to the first clamp.

6. The unmanned aerial vehicle of claim 5, further comprising a third clamp attached to the chassis, wherein the heating element is movably connected to the third clamp.

7. A system, comprising:
an unmanned aerial vehicle including
a chassis;
a tank attached to the chassis;
a sprayer fluidly connected to the tank;
a heating element attached to the chassis;
a fan drawing air over the heating element; and
a clamp attached to the chassis; and
a computer in communication with the unmanned aerial vehicle and programmed to
instruct the clamp to attach to an external sensor of a vehicle;
instruct the sprayer to spray water and detergent onto the external sensor; and
instruct the fan to blow heated air at the external sensor.

8. The system of claim 7, wherein the computer is programmed to instruct the clamp to attach to the external sensor before instructing the sprayer to spray water and detergent.

9. The system of claim 8, wherein the clamp is a first clamp, and the unmanned aerial vehicle further includes a second clamp attached to the chassis.

10. The system of claim 9, wherein the computer is further programmed to instruct the first clamp to detach from the external sensor, and then instruct the second clamp to attach before instructing the fan to blow heated air.

11. The system of claim 7, wherein the clamp is a first clamp, and the unmanned aerial vehicle further includes a second clamp attached to the chassis and a brush movably connected to the second clamp.

12. The system of claim 7, wherein the tank is a first tank, the sprayer is a first sprayer, the unmanned aerial vehicle further includes a second tank attached to the chassis and a second sprayer fluidly connected to the second tank, the computer further programmed to instruct the second sprayer to rinse the external sensor.

* * * * *